US012236548B2

(12) United States Patent
Palamadai et al.

(10) Patent No.: US 12,236,548 B2
(45) Date of Patent: Feb. 25, 2025

(54) SYSTEM AND METHOD FOR NEGOTIATION AND PERMANENCE MANAGEMENT OF METAVERSE MASHUPS

(71) Applicant: AT&T Intellectual Property I, L.P., Atlanta, GA (US)

(72) Inventors: Rashmi Palamadai, Naperville, IL (US); Eric Zavesky, Austin, TX (US); Brian Novack, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 176 days.

(21) Appl. No.: 17/982,554

(22) Filed: Nov. 8, 2022

(65) Prior Publication Data

US 2024/0153224 A1 May 9, 2024

(51) Int. Cl.
*G06T 19/20* (2011.01)
*G06Q 50/00* (2012.01)

(52) U.S. Cl.
CPC ............ *G06T 19/20* (2013.01); *G06Q 50/01* (2013.01); *G06T 2219/024* (2013.01); *G06T 2219/2016* (2013.01)

(58) Field of Classification Search
CPC ............... G06T 19/20; G06T 2219/024; G06T 2219/2016; G06Q 50/01
See application file for complete search history.

(56) References Cited

U.S. PATENT DOCUMENTS

| | | | | |
|---|---|---|---|---|
| 9,266,027 | B1* | 2/2016 | Yano | A63F 13/69 |
| 10,086,288 | B1* | 10/2018 | Surjo-Subagio | H04L 67/141 |
| 2011/0113018 | A1* | 5/2011 | Hamilton, II | A63F 13/12 |
| | | | | 707/E17.005 |
| 2012/0229446 | A1* | 9/2012 | Hyndman | G09B 5/06 |
| | | | | 345/473 |
| 2013/0111367 | A1* | 5/2013 | Park | H04N 21/278 |
| | | | | 715/757 |
| 2022/0331698 | A1* | 10/2022 | Krietzman | A63F 13/69 |

OTHER PUBLICATIONS

Hill, Kashmir, "This is Life in the Metaverse", https://www.nytimes.com/2022/10/07/technology/metaverse-facebook-horizon-worlds.html, Oct. 7, 2022, 10 pages.

* cited by examiner

*Primary Examiner* — Yu Chen
(74) *Attorney, Agent, or Firm* — GUNTIN & GUST, PLC; Douglas Schnabel

(57) ABSTRACT

Aspects of the subject disclosure may include, for example, receiving first defining information for a first metaverse, receiving second defining information for a second metaverse, automatically identifying conflicts between the first defining information and the second defining information, automatically negotiating resolution of the conflicts between the first defining information and the second defining information to define rules for a merged metaverse, merging the first metaverse and the second metaverse according to the rules for the merged metaverse to define a destination metaverse, and interacting with a plurality of users to create for the plurality of users an immersive experience in the destination metaverse. Other embodiments are disclosed.

20 Claims, 8 Drawing Sheets

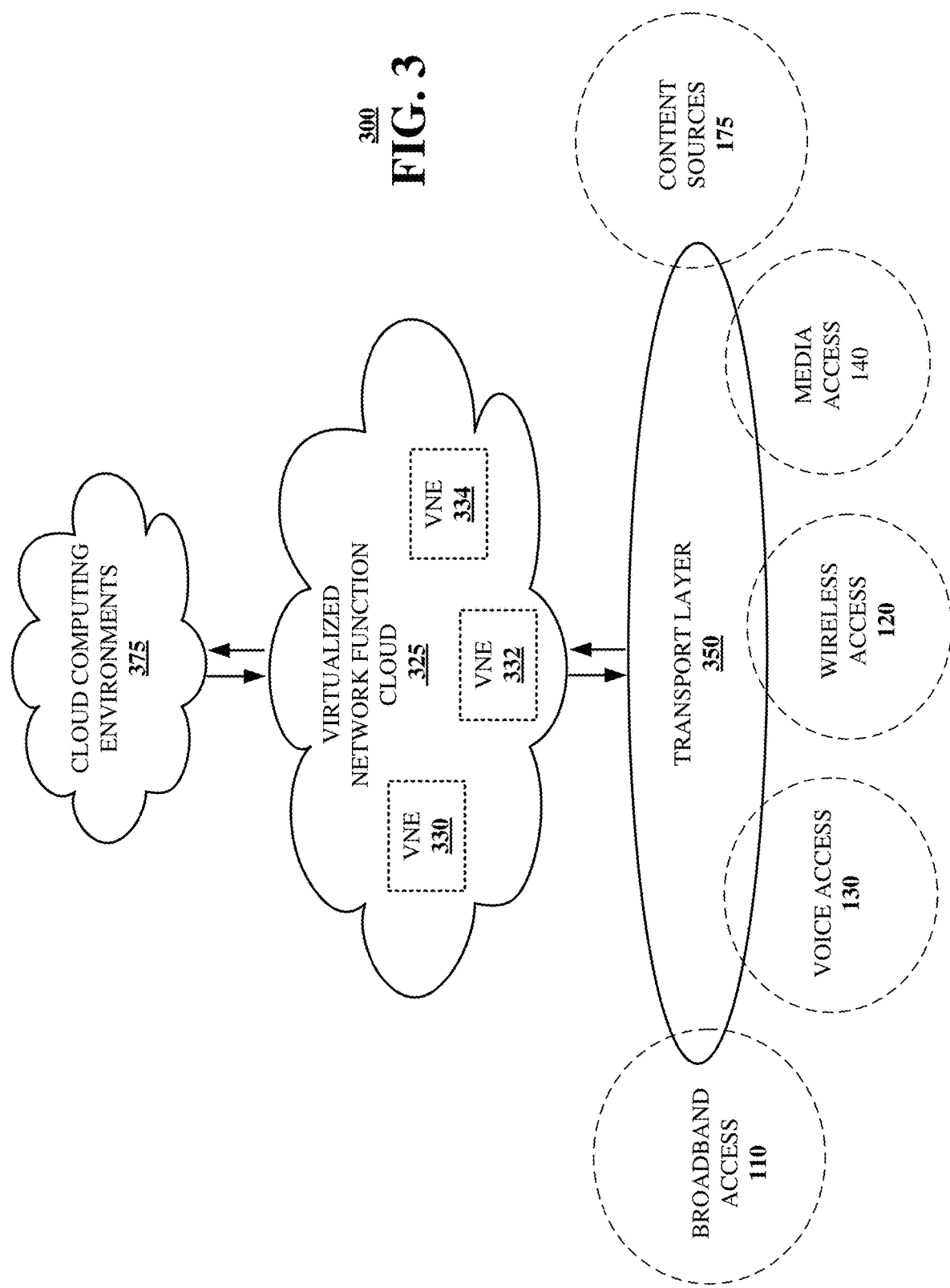

SYSTEM AND METHOD FOR NEGOTIATION AND PERMANENCE MANAGEMENT OF METAVERSE MASHUPS

FIELD OF THE DISCLOSURE

The subject disclosure relates to managing operations for merging two or more metaverses.

BACKGROUND

A metaverse is conventionally a virtual environment established by a corporate or other entity using networks and devices of the entity. Users may access entity networks and devices in order to interact with other users and/or environments.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for automatically, by a processing system, merging or mashing-up two or more independent metaverses to form a destination metaverse. Objects of the source metaverses may be modified to account for differences in the source metaverses. Differences between the source metaverses may be automatically negotiated and resolved by the processing system. Destruction or termination of the destination metaverse may be defined along with permanence rules for some objects of the destination rules. The destination metaverse may be instantiated to create an immersive experience for one or more users who may interact in the destination metaverse with suitable user equipment. Other embodiments are described in the subject disclosure.

One or more aspects of the subject disclosure include receiving first defining information for a first metaverse, receiving second defining information for a second metaverse, automatically identifying conflicts between the first defining information and the second defining information, automatically negotiating resolution of the conflicts between the first defining information and the second defining information to define rules for a merged metaverse, merging the first metaverse and the second metaverse according to the rules for the merged metaverse to define a destination metaverse, and interacting with a plurality of users to create for the plurality of users an immersive experience in the destination metaverse.

One or more aspects of the subject disclosure include receiving information defining a first metaverse, receiving information defining a second metaverse, the second metaverse to be merged with the first metaverse to form a destination metaverse, identifying first objects of the first metaverse, identifying second objects of the second metaverse, identifying modifications of the first objects required to form the destination metaverse, and identifying modification of the second objects required to form the destination metaverse. Aspects of the subject disclosure further include modifying the first objects and modifying the second objects to form the destination metaverse, identifying conflicts created by the modifying the first objects and the modifying the second objects and negotiating a resolution of the conflicts in the destination metaverse.

One or more aspects of the subject disclosure include identifying a first metaverse for merging, identifying a second metaverse for merging, modifying, by the processing system, the first metaverse and the second metaverse to form a destination metaverse, the destination metaverse including selected features of the first metaverse and the second metaverse, and facilitating interaction of a first user and a second user in an immersive environment of the destination metaverse.

Figure 1:
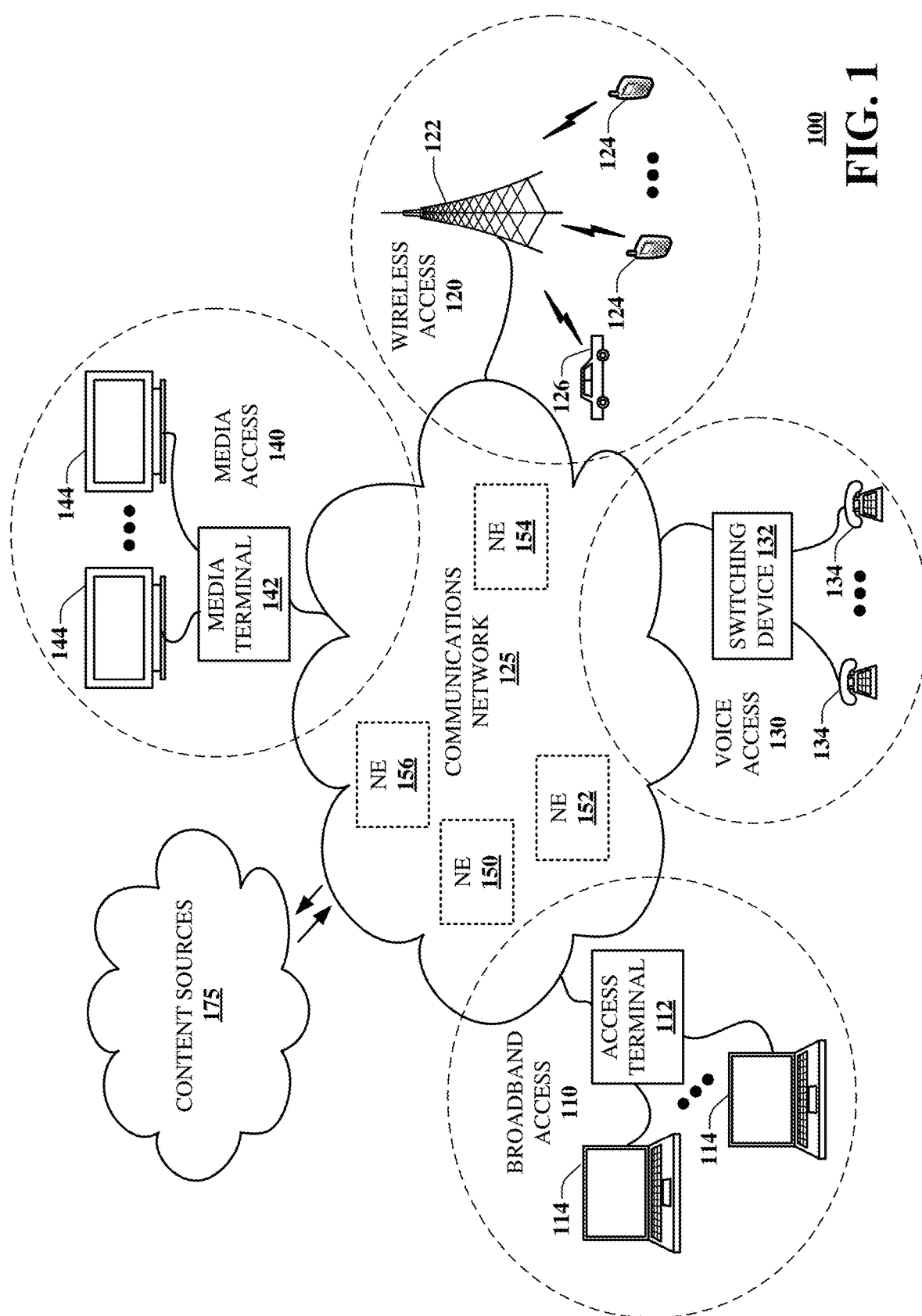
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part a merger of two or more metaverses to form a destination metaverse or pocketverse. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
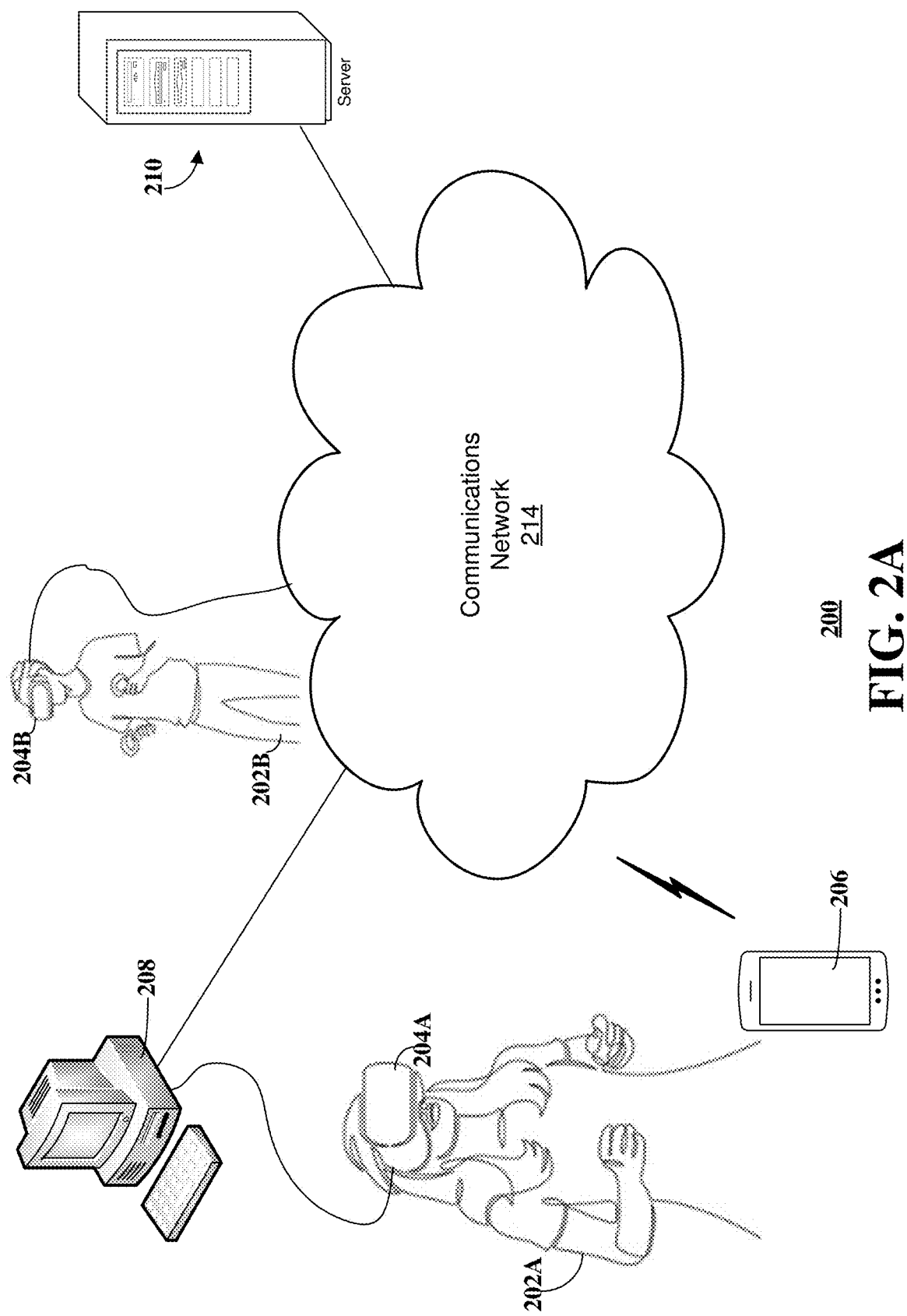
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. In the exemplary embodiment of FIG. 2A, the system 200 includes virtual reality (VR) headset 204A wearable by the user 202A, a VR headset 204B wearable by a user 202B, a user computer 208 and a metaverse platform 210 accessible over a communications network 214. The system 200 of FIG. 2A may be used by one or more users such as user 202A and user 202B to participate in immersive experiences in one or more metaverses.

A metaverse includes a set of technologies that combine to create an immersive experience for one or more users. The immersive experience may occur in a persistent virtual world that continues to exist even after a user has left the virtual world. Metaverse worlds can be created using immersive reality (IR), augmented reality (AR), virtual reality (VR), mixed reality (MR) or extended reality (XR). These will be referred to collectively as VR herein, but the devices, concepts and techniques described herein may be extended to all similar or related technologies. In some examples, a metaverse experience can include an online or digital economy where users can create, buy and sell goods and services.

Conventionally, the metaverse is often conceived as a single, unitary virtual world. In particular, the metaverse promoted by Meta Platforms, Inc., is conventionally considered to be the commonly understood metaverse. In this conventional metaverse, many virtual worlds and experiences may be defined by participants and the worlds may be accessed together or alone by respective participants. The participants generally access the conventional metaverse using user equipment such as a VR headset. The VR headset provides video and audio capabilities and may access dedicated computing and network facilities of a provider such as Meta Platforms, Inc. This conventional metaverse is a large ecosystem built within large scale datacenters and server farms.

Other metaverses may be created for use by a variety of users. In an example, an individual may create an independent metaverse for access by the individual and other users. The users may share experiences within the independent metaverse. The user may create the metaverse to have aspects and features according to specification of the user. In other examples, the user may create the metaverse using standard components and features and extend those standard components to novel functionality. The metaverse may include one or more sub-verses. Users from other metaverses may be invited to join and participate in the metaverse. In an example, two or more metaverses could be joined or integrated into a single common metaverse. The two metaverses could combine as peers into one metaverse, or one metaverse could nest inside another as a sub-verse. The common metaverse could have a defined, temporary definition or no defined termination, so essentially infinite in duration. The common metaverse may be permanently mashed-up or may subsequently separate, with some assets going to one child metaverse or another. Currently, no arrangement exists for managing combination or mash-up of two or more metaverses into a single metaverse.

As the creation of metaverses (which may be referred to herein as 'verses) expands from the single large entities such as Meta Platforms, Inc., into personalized- and brand-powered 'verses, the ability to combine or mash-up various 'verses will grow in importance. Not only will individuals from respective metaverses want to overlay and bring their own assets, such as non-fungible tokens (NFTs), into the metaverse space of others, but the individuals will want to maintain ownership of their own metaverse assets, carry out commerce within or around the metaverses, and perform other activities. Additionally, the rules that govern the interactions of the mash-up 'verse must be predetermined as a choice, hybrid, or exclusion from the source 'verses. Finally, inclusion of user feedback and choice for how to resolve the mash-up is a critical need for comfort and engagement within an immersion.

Referring again to FIG. 2A, it shows a block diagram illustrating an example, non-limiting embodiment of a system 200 functioning, for example, within the system 100 of FIG. 1 in accordance with various aspects described herein. The system 200 in this embodiment includes a user 202A wearing a virtual reality (VR) headset 204A, a user 202B wearing a VR headset 204B, a user device such as a smartphone 206 carried by the user 202A, a user computer 208 and a metaverse platform 210 accessible over a communications network 214.

The VR headset 204A and the VR headset 204B enables the user 202A and the user 202B to experience, generally, an XR environment, where XR is a general term intended to encompass XR, virtual reality (VR), mixed reality (MR) and augmented reality (AR) systems, equipment and environments. The VR headset 204A and the VR headset 204B generally include a data processing system including one or more processors, a memory for storing data and instructions, and a communication interface. The VR headset 204A and the VR headset 204B provide visual display to the user 202A and the user 202B and may include one or more display screens within the VR headset 204A and the VR headset 204B to control the view seen by the user 202A and the user 202B, as well as the environment experienced by the user 202A and the user 202B. Further, the VR headset 204A and the VR headset 204B may each include a camera for capturing images of the environment of the user. The VR headset 204A and the VR headset 204B may include speakers to provide sound information to the user 202A and the user 202B and the VR headset 204A and the VR headset 204B may include one or more microphones to collect sound information about the environment of the user 202*a* and the user 202B. In other embodiments, the VR headset 204A or the VR headset 204B may be embodied as AR glasses or goggles or other wearable devices or may be operated in conjunction with a fixed display system such as a computer monitor, television or series of display screens in the physical environment with the user 202A or the user 202B.

The user computer 208 is in data communication with one or both of the VR headset 204A and the VR headset 204B. In the illustrated embodiment, the user computer 208 has a wireline connection to the VR headset 204A. In other embodiments, the wireline connection may be supplemented or replaced with one or more wireless connections, such as a Wi-Fi connection according to the IEEE 802.11 family of standards or a Bluetooth connection according to the Bluetooth standard. In the example of FIG. 2A, the user computer 208 may have a wireless connection to the VR headset 204B or in some embodiments, the VR headset 204B may not communicate with the user computer 208.

The user computer 208 cooperates with the VR headset 204A, and in some examples the VR headset 204B, to provide the XR environment for users including the user 202A. The user computer 208 communicates with the VR headset 204A to provide video information, audio information and other control information to the VR headset 204A. The user computer 208 communicates with the metaverse platform 210 to provide video and other information from the VR headset 204A to the metaverse platform 210. The video and data may be sent in any suitable format, including encoding to reduce the amount of data transmitted or encrypted to maintain security of the data. The user computer 208 communicates to the VR headset 204A virtual reality information of a metaverse to the VR headset 204A. In some embodiments, the functionality provided by the user computer 208 may be combined with the VR headset 204A. In the embodiment of FIG. 2A, the user computer 208 is shown as a desktop computer. However, any suitable processing system, including one or more processors, memory, and communications interface, may implement the functions of the user computer 208.

The smartphone 206 or any other user device is under control of the user 202A. The smartphone 206 is further in data communication with the communications network 214, for example through a cellular network such as wireless access 120 (FIG. 1).

The metaverse platform 210 controls provision of one or more independent metaverse environments to the VR headset 204A for the user 202A and for the VR headset 204B for the user 202B. The metaverse platform 210 generally includes a processing system including one or more processors, a memory for storing data and instructions and a communications interface. The metaverse platform 210 may be implemented as a single server computer, as multiple server computers at one or multiple locations or in any suitable manner. In the system 200, the metaverse platform 210 implements one or more metaverses that may be combined in some circumstances and according to particular rules.

The metaverse platform 210 receives over the communications network 214 information about the environment of the user 202A and the user 202B, including location information, information about objects in the environment and events occurring in the environment of the users. The user 202A and the user 202B may be in the same physical location or different physical locations. The user 202A and the user 202B may interact in the same independent metaverse or they may access different respective independent metaverses. The metaverse platform 210 in some embodiments may further receive information about the user 202A and the user 202B, including biometric information and information about the performance of the user 202A and the user 202B. The information may come from the VR headset 204A, the VR headset 204B or any other source. Under control of the metaverse platform 210, control information is provided over the communications network 214 including video information, sound information, haptic information and any other information, including instructions and data, to the other components of the system 200 including the user computer 208, the VR headset 204A and the VR headset 204B.

The metaverse platform 210 develops a metaverse including an XR environment as a combination of the actual environment in which the user 202 is located and a simulated or virtual environment, to achieve ends such as training, entertainment, education, performance improvement, and behavioral improvement for the user 202A and the user 202B. In other embodiments, other metaverse platforms may create additional metaverses accessible by the user 202A, the user 202B and other users, not shown in FIG. 2A. Multiple users may engage each other in a metaverse generated and controlled by the metaverse platform 210 or by another metaverse source. Further, each user including the user 202A and the user 202B may be represented in a respective metaverse, such as by an avatar associated with the user.

In some examples, multiple metaverses may be combined or mashed together to form a common metaverse. After defining the common metaverse, data corresponding to the common metaverse may be stored in any suitable location, such as the user computer 208, the metaverse platform 210, or another location accessible over the communications network 214.

The communications network 214 may include any combination of wireline and wireless communication networks, including but not limited to broadband access network 110, wireless access network 120, voice access network 130 and media access network 140 (FIG. 1). The communications network 214 may include the internet and may provide access to other devices and services as well.

Figure 2B:
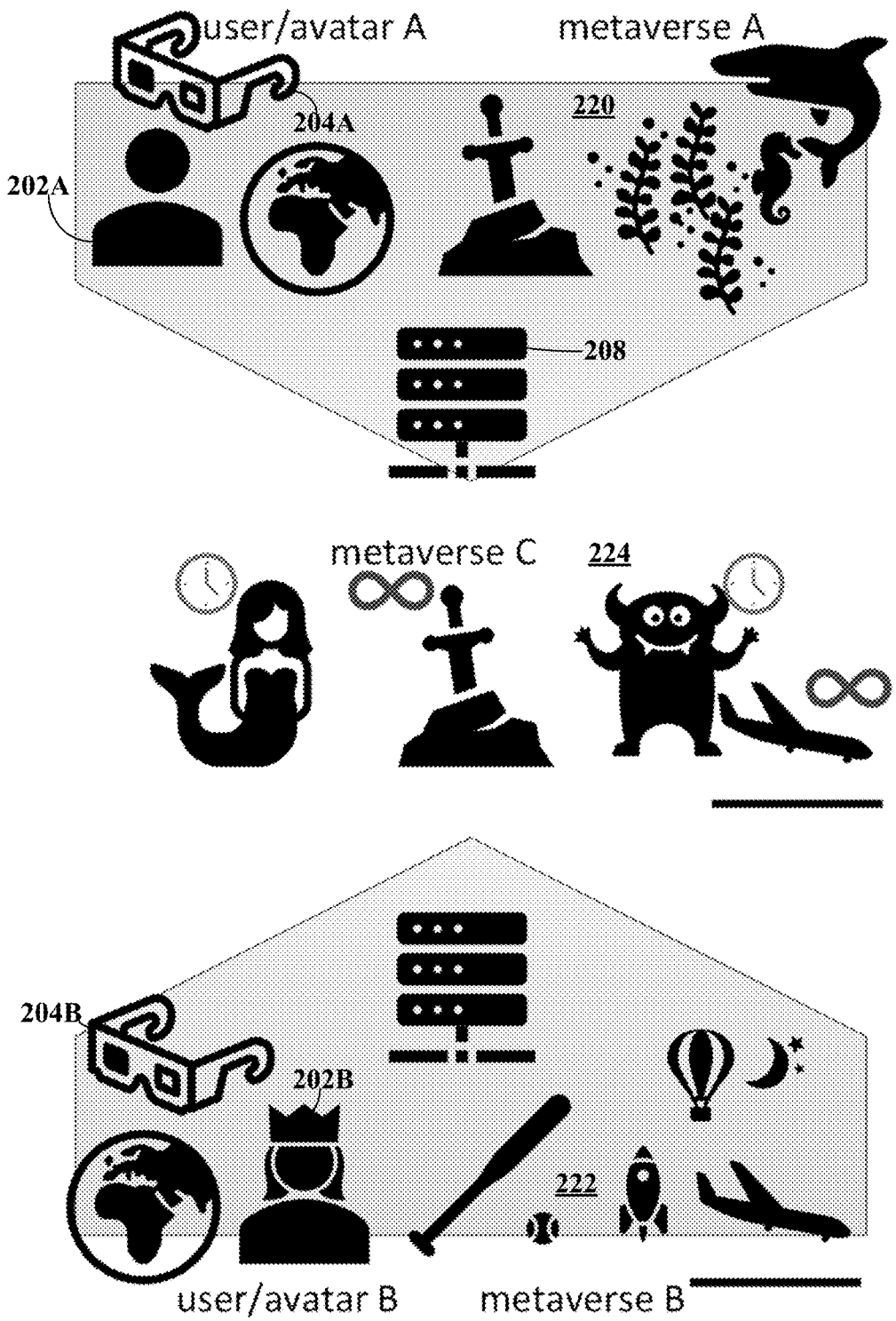
FIG. 2B is a block diagram which depicts conceptually a merging of two existing metaverses into a single metaverse in accordance with various aspects described herein.

FIG. 2B is a block diagram which depicts conceptually a process 218 of merging of two existing metaverses into a single metaverse in accordance with various aspects described herein. In the example, a first metaverse 220 and a second metaverse 222 are being merged or mashed up to form a third metaverse 224. User 202A is active in the first metaverse 220, labelled metaverse A. The user 202A wears VR headset 204A to experience the virtual reality immersion of the first metaverse 220. User 202B is active in the second metaverse 222, labelled metaverse B. User 202B wears VR headset 204B to experience the virtual reality immersion of the second metaverse 222. Following the merger or mash-up, third metaverse 224 includes some aspects of both the first metaverse 220 and the second metaverse 222. These aspects are illustrated graphically in FIG. 2B. Not all aspects of each original metaverse are carried over to the merged metaverse 224.

In the example, each user can create a personal, independent metaverse for particular purpose. The personal metaverse may be populated by any combination of items and functions. Each user can invite other users to join the personal metaverse and participate therein. Each personal metaverse may be a singular metaverse or may be a sub-verse of a larger, integrated metaverse. Other users from other metaverses may be invited to join and even to create a hybrid metaverse that may be either temporary in duration or intended to be permanent. The first metaverse 220 and the second metaverse 222 may be considered source metaverses. The third metaverse 224 may be considered a destination metaverse. Any number and type of source metaverse may be combined to form a destination metaverse.

The possibility of joining two or more metaverses raises operational and organizational issues. Such issues relate to how such metaverses come together or join, whether duration is for a short time or intended to be permanent. Such issues also relate to whether components of each metaverse are destroyed or combined in the common, merged metaverse. Such issues relate to organization or hierarchy, such as whether merging metaverses are peers or whether one merging metaverse nests inside another metaverse. Such issues relate also to ownership and to managing certain interactions among elements of the merging metaverses, as well as common objects and functions as well as new objects and functions. Such issues relate to rules of inheritance between merging or nesting metaverses. Such issues relate to management of the future dissolution or destruction or separation of the merged common metaverse into two or more independent metaverses. Such issues relate to understanding types of objects in each metaverse and representing each object correctly in different metaverses. For example, an avatar in a first metaverse merged into a second metaverse may imbibe rules and restrictions of the second metaverse and become what is defined as the appropriate avatar for that specific metaverse.

In accordance with various aspects described herein, a processing system may manage and address these issues and others related to the merging or mashing up of two or more source metaverses. Any type of metaverse may be included. A process of merging the metaverses by the processing system may include identifying translatable objects and negotiating the translation of such objects from source metaverses to a common destination metaverse. This includes appearances of objects and functionality of objects across the different metaverses. The process of merging the metaverses by the processing system may further include reaching agreement on rules of permanence such as ownership of objects, destruction of objects, and so forth, for activity within the common destination metaverse. The process of merging the metaverses by the processing system may further allow interactive conflict resolution for mash-up conflicts. For example, the processing system may offer an adjustment to conditions in the common destination metaverse to resolve the conflict. Users can accept the offer, further negotiate a conflict resolution, or opt out of the conflict.

Figure 2C:
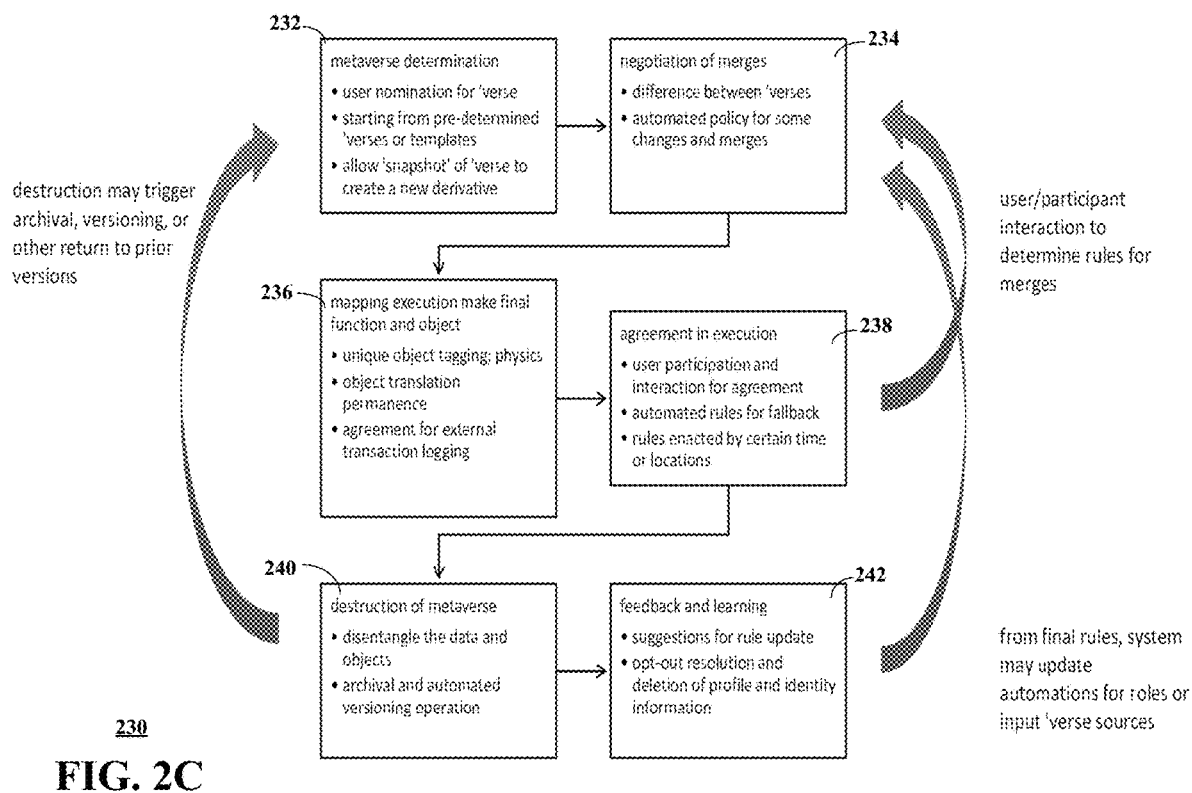
FIG. 2C depicts an illustrative embodiment of a method in accordance with various aspects described herein.

FIG. 2C depicts an illustrative embodiment of a method 230 in accordance with various aspects described herein. The method 230 may be used in conjunction with a process of merging or mashing up two or more metaverses. In an example, each of two metaverses has been created by a user or group of users. Each metaverse may be referred to as a source metaverse and includes various objects and functions that may be experienced as an immersion by one or more users equipped with user equipment such as VR headsets. The example is intended to be illustrative only and principles of the example may be extended to the widest variety of situations and embodiments.

In the example, each source metaverse has one or more managers that may be referred to as superusers or administrators or authors. Further, the managers may be referred to as one or more content creators or participants. These managers may be natural persons, groups of persons, processing systems or other metaverses. These managers establish the initial parameters and rule logic that define the metaverse and its elements. Such parameters may further define structure of the source metaverses, including any hierarchical levels within the source metaverse or nested levels or metaverses within the source metaverse. Such parameters may further define functions and objects in the source metaverses. Such parameters may further define supervision, privacy and security in the source metaverses. Such parameters may further define identities of participants including for example, avatars that may be used including characteristics of such avatars. Each respective source metaverse is established with defining parameters that may vary over time.

The method 230 of FIG. 2C may be performed by any suitable data processing system with access to information about the one or more metaverses being merged. In the example of FIG. 2A, the method 230 may be performed by the metaverse platform 210, the user computer 208, or any other suitable processing system.

Step 232 of method 230 includes determining information about each metaverse to be merged. For example, one source metaverse may be instantiated on the user computer 208 with all relevant data stored on user computer 208 or accessible by user computer 208 over communication network 214. Similarly, another source metaverse may be instantiated on the metaverse platform 210, with relevant metaverse data stored on the metaverse platform.

Step 232 may further include identifying the source metaverses and users of the source metaverses including managers of the source metaverses. Identifying users of the source metaverses may further include identifying current participants of the source metaverses.

In some embodiments, one or both source metaverse is an existing, fully functioning metaverse with active participants. Such a metaverse may be changing dynamically in terms of user activities, user presence, current functioning and scenarios. The dynamic operation may be reflected in constant updating of the data defining the source metaverse or the state of the source metaverse. In order to limit the amount of data to be processed due to the dynamic operation of the source metaverse, step 232 may include an operation of capturing a snapshot of the source metaverse at a moment in time. The current data defining the source metaverse at the snapshot moment may be stored for further processing. The snapshot of the source metaverse may be modified for inclusion in the destination metaverse. Subsequent changes to the state of the source metaverse may not be captured or available.

In some embodiments, one or both of the source metaverses is a template, model or master metaverse. Such a metaverse may be used to develop a custom metaverse based on the template, model or master. Use of a template, model or master that has preexisting metaverse features may simplify and expedite custom metaverse development for a manager developing a new custom metaverse. Step 232 encompasses using such a template, model or master metaverse as a source metaverse.

Step 232 may further include an initial evaluation of metaverse parameters, rules, logic and other defining information for each source metaverse. The initial evaluation might include determining what different functions the source metaverses implement, what different objects the source metaverses contain, what different rules control and bring order to the source metaverses and what different restrictions define the source metaverses. The initial evaluation might further consider security and privacy that is offered to participants as well as the number and identities of all participants. Any other relevant parameters may be collected and assessed by the processing system performing step 232.

Further at step 232, the processing system evaluates whether the source metaverses, including their objects, their rules, their security, and so forth, can actually be merged. Step 232 includes a consideration of whether there are issues that need to be resolved because of conflict parameters. In one example, one source metaverse is targeted at children, for education, entertainment or another purpose. A second source metaverse is targeted at adult entertainment or education. A review of the rules for the two source metaverses may force the conclusion that the two source metaverses cannot be merged. Any suitable standard may be used such as by determining a number of conflicts in rules for each source metaverse and prohibiting the merger if the number of rule conflicts exceeds a predetermined threshold. In another example, each rule conflict may be assigned a quality of conflict severity and the conclusion to prohibit the merger made using a measure of cumulative conflict severity. For example, if the two source metaverses have rules defining acceptable age ranges for user, and the age ranges overlap so that a first source metaverse has a restricted age range of 16-19 years and the second source metaverse has a restricted age range of 18-25 years, the overlap may be sufficient to consider this to be a low-severity conflict. On the other hand, if the restricted age ranges do not overlap at all, the processing system may identify the conflict as a high-severity conflict.

In another example, a winter metaverse exists and includes a winter animal sub-metaverse. In this example, a metaverse dedicated to polar bears may wish to merge with the winter animal sub-metaverse. However, based on qualitative factors quantitative factors, the merger may be prohibited. Any suitable measurement or thresholds may be used. Step 232 may include prohibiting the merger of the two source metaverses.

Step 234 includes a process of negotiating the merger of the two or more metaverses. Many aspects of a merger may need to be identified as an issue for the merger, for negotiation and for resolution. In embodiments, the negotiation process is automated by a data processing system with access to information about the merging source metaverses, including structure, functionality, rules and policies of each.

For example, the processing system may identify and negotiate translatable objects, appearances and functionalities across the different metaverses. Some objects may be precluded from being moved from a first metaverse to a second metaverse, or the movement or translation may require a chance in appearance or functionality.

In another example, the processing system may identify and negotiate rules defining permanence for activity within the mashed-up metaverse. Permanence may relate to ownership of objects and aspects of the destination metaverse. For example, the destination metaverse may be defined to include a particular chat room devoted to a particular topic, and this chat room is a carryover from one of the source metaverses. The processing system must negotiate which user is responsible for rules and policies and enforcement thereof in the chat room in the destination metaverse. Permanence may further relate to destruction of features of one or more source metaverse in the destination metaverse. For example, the noted chat room carried over from the source metaverse to the destination metaverse may come with a defined end date after which the chat room will be closed to all users. The processing system must determine if that policy is to continue for the chat room in the new metaverse or be modified.

At step 234, if conflicts of rules or any other metaverse features exist, method 230 includes a negotiation of conflicts to find some resolution of the conflict. Step 234 includes a process of determining how to deal with conflicts in a meaningful way. Any suitable resolution may be used. In an example, the processing system automatically initiates a negotiation between each of the source metaverses to identify any new object that should be created or any existing object that should be transferred from one source metaverse to another, for example.

In another example, if a user has certain objects that have a particular value, the processing system may implement a conversion mechanism so that the user is suitable compensated for the value of the object going forward into the destination metaverse. In some situations, a transaction or modification may not be reversible. For example, some objects may be destroyed upon execution of the merger of the mashups, or currency existing in one metaverse may not continue to exist in the destination metaverse. In that case, a negotiation may occur to compensate a participant for any loss in value following the merger of the metaverses.

In a further example, step 234 may include negotiation of rule logic between the source metaverses to determine a manager or designated administrator of the destination metaverse. In some embodiments, a hierarchy of administrators may be established, designating managers from each source metaverse for specific roles in the destination metaverse.

In a further example, it may occur that the first source metaverse is instantiated on a first platform and the second source metaverse is instantiated on a second platform. The two platforms each provide technical support and capabilities for metaverses running on the platform. Such support may include data processing, data communication and other features. In the process of negotiating a merger, it may occur that certain features of the first platform are not available on the second platform. Step 234 may include several possibilities for resolving this conflict. In a first resolution, the processing system executing step 234 recognizes the conflict and the merger is rejected. In a second possibility, the processing system identifies an alternative solution to over-come the conflict and suggest the alternative solution to the respective source metaverses. For example, if the first source metaverse is implemented on a platform that offers only audio capability and the second source metaverse is implemented on a platform that offers audio-visual capability, the processing system may suggest a hybrid metaverse with both audio-visual and audio-only environments as an alternative solution. Any suitable alternative may be suggested in negotiation step 234 including creating hybrid features in the destination metaverse.

In further examples, the processing system may try to negotiate other hybrid solutions to manage any discontinuities between the two source metaverses. For example, a particular participant in the first source metaverse may be unable to join the destination metaverse after the merger due to some rule or policy of the second source metaverse or the destination metaverse. That particular user is barred from joining the destination metaverse and returned to the first source metaverse. The merger continues for the benefit of all other participants to the exclusion of the particular participant. In another example, as a result of the merger, a visual or interactive conflict may arise at a particular location in the destination metaverse. For example, the first source metaverse included a stairway down to a lower level but the destination metaverse is agreed to have only a single level. In that instance, the processing system may agree to instantiate the destination metaverse with an indication that there is a logical disconnect between the different, mashed up metaverse at this location. The indication may be visual, audible or any suitable advice to participants in the merged metaverse.

Step 234 may include relying on certain default conditions defining relationships and functions of the destination metaverse. For example, a parent-child social structure may be established and relied on as a default. In another example, conventional Newtonian physics may be established as a default. The default may be modified as agreed upon, such as defining a portion of the destination metaverse where gravity is only one-tenth its conventional value.

In another example, social interaction rules may be set according to a default or may be modified according to agreement. As an example, interactions may default to exclude violence between participants and to exclude certain language or trigger words. However, in a metaverse focused on martial arts, the exclusion of violence may be relaxed to allow the participants to physically interact. Such rules can be defined upon creation of the destination metaverse.

Step 236 may include a process of mapping of objects and functionality for merging aspects of the source metaverses in the destination metaverse. Aspects of performing the metaverse merger in step 236 may include identifying and tagging unique objects in each source metaverse, translating each object into the destination metaverse, and in embodiments, keeping a log of changes that are made. Operations of step 236 may be done automatically by a data processing system.

Merging two source metaverses may include combining objects from each source metaverse into the destination metaverse. In embodiments, the term objects may have the broadest meaning in these virtual environments. An object may be a virtual object which a user or the user's avatar can hold or interact with or exchange. An object may be a virtual person or thing in one of the virtual environments. An object may be a space such as a chat room or a gaming environment or instructional space located in one of the virtual environments. Each object may be defined by any combination of properties in the virtual world including dimensions, appearance, sound and texture, as well as temporal aspect such as duration and variation with time. For example, a virtual space for training one user by another user may have a particular appearance and dimensions. Over time, as the training progresses to more complicated levels, the virtual space may expand and new virtual objects for training my automatically appear in the virtual space. Such features are generally under control of rules and policies that control each virtual environment.

Step 236 may therefore include identifying unique objects in each source metaverse. Depending on the metaverse determination of step 232 and the negotiations of step 234, unique objects may be added to or transferred to the destination metaverse, or such unique objects may remain in a source metaverse. Step 236 may include a process of tagging or identifying each object. Such tagging may include identifying or recording information about the object including its features in the source metaverse. Such tagging may include indicating if the object is to be carried over to the destination metaverse, remain in the source metaverse, or a combination of these. For example, some or all aspects of the object may be copied from the source metaverse to the destination metaverse. Tagging may include making a record of properties of an object, person or other item. The tagging information may be stored in any suitable format in any suitable location.

Step 236 may further include conforming physics of the source metaverses in the destination metaverse. The physics of a virtual environment relates to how objects in the virtual environment interact with each other. Physics of the virtual environment may match those of the physical world or virtual physics may vary from the physical world. Step 236 may include identifying particular variations in physics of the source metaverses and tagging or otherwise noting such variations for extension to the destination metaverse.

Step 236 may further include object translation from source metaverses to the destination metaverse. Translation may refer to any modification to a virtual object or its properties as it moves from a source metaverse to a destination metaverse, based for example on negotiations of step 234. For example, the appearance of an object might be modified upon movement from the source metaverse to the destination metaverse, or the position of an object relative to other objects may be modified. A user's avatar that has a certain appearance and properties in a source metaverse may have a different appearance and properties in the destination metaverse, due to different rules or policies in the mashed-up metaverse.

Step 236 may involve modifications to the permanence of an object as the object moves from a source metaverse to a destination metaverse. The permanence of the object may relate to its duration in the virtual environment. For example, an object may be scheduled to be destroyed at a certain time in the source metaverse. In the destination metaverse, because of the negotiations of step 234, the object may be changed to have an unlimited duration in the destination metaverse. Permanence may relate to ownership of an object, as well, and ownership may be affected by the negotiations of step 234. For example, a first user associated with a first source metaverse may have ownership of a particular object. Ownership includes the right and responsibility to set rules and parameters for the object, to control the properties of the object. Step 234 or any other aspect of method 230 may include modifying ownership to change ownership to another user or to change the nature of ownership of the object to, for example, joint ownership between two or more users.

Step 236 may further include a process of logging the activities of step 236. Logging may be done in any suitable manner such as storing to a memory data defining changes to each object and its properties. Logging may be done for any suitable purpose, such as simply making a record of the changes that are made in developing the destination metaverse or to enable changes made during performance of steps of the method 230 to be reversed at any time.

Step 236 in embodiments include development of all aspects of the destination metaverse. Some aspects may be left undefined or defined with a virtual notice identifying a discontinuity that could not be resolved. Generally, following step 236, the details of the destination metaverse are available to all potential participants.

In step 238, participants are given a chance to agree to participate in the destination metaverse or to opt out of such participation. As indicated in FIG. 2C, a user or participant in the destination metaverse may, through interaction with the destination metaverse, provide feedback or control the rules for mergers of the metaverses. In some examples, users may be given a full disclosure of the changes made in developing the destination metaverse. Such disclosure may be based on or include, for example the log of changes made in step 236. If the users or participants agree, they agree to be bound by the rules and policies of the destination metaverse. Their agreement may cover a set of automated rules that establish a baseline operation or functionality. Their agreement may cover emergency situations or situations that are not otherwise covered by existing rules. Their agreement may set a default, such as deferring to a designated manager or superuser of the destination metaverse for decision making. Further, the users may agree to variations in the rules or policies that control the destination metaverse. Such variations may occur as agreed-upon modifications over time, as experience with the destination metaverse demonstrates a need for the modification to cover and unplanned for situation. Such variations may be programmed or scheduled to occur based on initial planning and agreement about the destination metaverse.

Alternately, step 238 may include an opt-out option for the users. Step 238 may provide the user an opportunity to accede to the transformation or development of the destination metaverse or refuse to participate in the destination metaverse. As the full details of the destination metaverse become evident at step 236, one or more users or participants may choose not to participate further in the destination metaverse. In an example, if value of some sort is taken from the opting-out user, the user may be compensated in some suitable manner. For example, if a virtual gaming environment is developed by the opting-out user in a source metaverse of the opting-out user, the virtual gaming environment may be added to the destination metaverse, the user compensated according to agreement or on any other basis, and the opting-out user may participate no further in the destination metaverse. The user may provide an opt-out indication to indicate a decision to opt-out.

In some embodiments, participants may be given a trial period before being required to opt in or opt out of the destination metaverse. The trial period may be of any suitable duration, such as one week or one month. The trial period may provide the participant with access to some or all features of the destination metaverse. In some examples, only a subset of features of the destination metaverse are made available to the participant. Provisions for the trial period may define details of the exit of the opting-out participant, such as ownership of objects, payment for contributions and so on. For example, if a participant opts out of the destination metaverse, any account or information maintained for the opting-out participant for the destination metaverse may be deleted or closes out and compensation made for virtual objects provided by the opting-out participant to the destination metaverse.

In embodiments, provision may be made for a user or participant to be offline or away from the destination metaverse for a period of time. Such a provision can accommodate the schedule and life events of the participant. The offline time may occur at the same time as a required opt-in time for the metaverse. In an example, the offline user is offline during the period when the destination metaverse is developed and features are negotiated. Since the offline user is not available, the offline user may miss an opportunity to opt-in or opt-out of the destination metaverse or to comment on the features of the destination metaverse. Thus, if the offline user is offline for an extended period of time, the account or other information of the offline user may be archived. Archiving may be accomplished in any suitable form. The offline user may subsequently receive opt-in details on a next subsequent login. This preserves the right and opportunity of users to agree or disagree to the transition to the destination metaverse.

In embodiments, step 238 may include a provision for handling a conveyance of privileges, rights and responsibilities between one metaverse such as a source metaverse and another metaverse such as the destination metaverse. In an example, the source metaverse includes a school and the destination metaverse is nested within the school metaverse and includes a nurse's office within the school. Participants in these two metaverses may include a student, a parent, a school administrator and a school nurse. In each respective metaverse, the participant will have certain privileges or status, depending on the role of the participant. For example, the administrator may have superuser status at any virtual location within the school metaverse, including the nurse's office sub-metaverse. The nurse may have primary privileges and status in the nurse's office metaverse but may further have only normal privileges, such as those of any staff member, in the school metaverse.

Step 238 may define how such role-dependent privileges or properties may be handled when traversing among metaverses. The agreement for execution among participants may cover such aspects. In some embodiments, the agreement may provide that the precise handling of role-dependent privileges or properties may be deferred to a later date but may also provide a default for initial cases that occur around the time of the inception of the destination metaverse.

In step 240, provision may be made for ultimate destruction of all or a part of the destination metaverse. Such destruction may occur at any time or for any reason, or in response to an occurrence of a predetermined condition. For example, the destination metaverse may be established for a particular purpose and for a particular time duration. At the end of that particular time duration, the destination metaverse comes to an end. In another example, an agreement among participants may set one or more conditions and one or more resolutions of the termination of the metaverse. Examples of such conditions may include departure of a specified number or percentage of participants such that shared activity declines, or completion or satisfaction of a purpose for which the destination metaverse was initiated, such as a training program for some participants. Once training is complete, the training metaverse may be terminate.

Whether agreements are in place for destruction of the destination metaverse, the process in embodiments involves a disentangling of the data and the objects forming the destination metaverse. In an example, multiple participants from multiple source metaverses contribute to the destination metaverse. Such contributions may include objects, such as virtual items or virtual spaces in a source metaverse which get transferred to the destination metaverse. Other contributions may include functionality such as a training program in a source metaverse that may be offered to participants in the destination metaverse. During the duration of the destination metaverse, other participants will interact with such contributions and generate data. Further, the interactions among participants may cause modification to the one or more objects. For example, during participation in the destination metaverse, the size and appearance of a virtual space may be changed based on activities therein of the participants. Destruction of the metaverse considers such modifications and changed ownership of objects or data of the metaverse. Any suitable handling of such modifications may be implemented.

As indicated in FIG. 2C, the process of destroying the metaverse in step 240 may trigger an archival process, a versioning process in which existing metaverse data is stored as a version or other return operation. In one example, the destination metaverse is automatically archived from time to time. Any suitable archiving may be performed including storing some or all data of the destination metaverse in a suitable location. Archiving may be done periodically, for example, such as monthly, or upon occurrence of some predefined event such as adding a new participant. The archived copy may be saved with a version indicator or a data or any other identification information. Archiving provides an ability to recover the destination metaverse if required for some reason. The metaverse may include a policy for retention of archived states. Some details that occurred after the last archive may be lost but generally, the destination metaverse may recreated at a last state or at some earlier state.

In some embodiments, step 240 includes a process of disaggregation of the elements of the destination metaverse. Disaggregation may include any suitable process or technique, generally implemented by a processing system. For example, disaggregation may be according to a previously agreed on procedure or priority that is implemented by the processing system. Disaggregation may be initiated by any suitable input such as a destruction indication to terminate or destroy the destination metaverse. In an example, objects of the destination metaverse that have originated in a source metaverse are removed or reassigned from the destination metaverse. Such objects may either be returned to the originating source metaverse or moved to another metaverse, or even deleted or destroyed. The disaggregation process in embodiments has awareness of the shared mapping of the objects of the destination metaverse and uses the shared mapping to separate the objects and associated data.

In embodiments, step 240 may include an awareness of permanence characteristics of the destination metaverse or of some of its constituent elements. Permanence applies to objects or other items in a metaverse that are intended to endure after the termination or destruction of the metaverse. These may be referred to as permanence items. In embodiments, permanence of respective objects is defined at or negotiated at, for example, step 234 or any other step of method 230. One or more permanence rules are decided upon to control disposition of permanence items at dissolution of the destination metaverse. In the event of termination of the destination metaverse, for any cause, the rules of permanence are applied to control the resolution or handling of each respective permanence item. In some embodiments, a default handling for a permanence item is set to define how new objects or objects not covered by the permanence rules are handled.

In some embodiments, protected intellectual property may be contributed, created or used by the destination metaverse. For example, one source metaverse may include a brand name for a product or service that is committed to the destination metaverse for use in transactions of goods or services. The brand name may include a trademark, registered or otherwise. In some other examples, through collaboration of participants in the destination metaverse, a work of authorship protected by copyright law may be created.

In such embodiments, provision for ownership of the created intellectual property may be made during the negotiation of step 234. Any mutually agreeable relationship may be made. Ownership of intellectual property assets may be retained by an original owner, shared by joint authors or assigned to one or more authors or assignees. In the event of termination of the destination metaverse, for any cause, the rules of permanence are applied and may give effect to any intellectual property rules established by participants in the destination metaverse. The participation rules or any other source may set a default condition for ownership or assignment of any intellectual property rights that may be transferred or created.

Step 242 may occur even if step 240, destruction of the destination metaverse, does not occur. Step 242 relates to a process of improving the method 230 overall and in individual steps. In embodiments, the destination metaverse or the processing system implementing the destination metaverse has an understanding that there may be opportunities to mash up or separate, partition or destroy metaverses and objects in the future. Accordingly, the destination metaverse may generated suggestions or methods to preserve integrity of each source metaverse as appropriate.

Step 242 may include processes of feedback and learning from the destination metaverse. In one example, an artificial intelligence module or a machine learning model may operate to control some or all of method 230. The artificial intelligence module or the machine learning model may receive feedback at step 242 and the feedback to provide a better result in future destination metaverses. In another example, step 242 may include providing to the negotiation process of step 234 suggestions for updating the rules used to develop and control the destination metaverse. For example, if, because of some unanticipated occurrence, a default rule was required, step 242 may include a suggestion to develop for the future a rule to cover the unanticipated occurrence. In an example, if operation of the destination metaverse resulted in creation of a work of authorship eligible for copyright protection, but the rules from step 234 did not provide for copyright ownership, step 242 includes a suggestion to provide rules in the future for the possible creation of a work of authorship and for the ownership thereof.

In embodiments, step 242 may include procedures for handling participants who opted out of participation in the destination metaverse. This may include any appropriate actions, such returning virtual objects to the opting-out participant and deleting any account information and identity information of the opting-out participant.

The method 230 of FIG. 2C may be extended to a wide variety of use cases. In a first example, a new or existing source metaverse may be merged or mashed-up with a branded metaverse containing branded material. The brands may be licensed intellectual property in the form of registered trademarks, common law trademarks or tradenames, or any other source identifier. The owner of the source metaverse and the owner of the branded metaverse may agree initially to various terms and conditions. Such terms and conditions may include how branded materials are handled in the mashed-up metaverse, how royalties may be assessed, legal liability, and other terms. Moreover, such terms and conditions may define legal separation between the parties and how the licensed intellectual property is handled upon termination of the agreement or of the mashed-up metaverse. In an example, the mashed-up metaverse implements an auto racing game and the licensed intellectual property includes a number of brand names or trademarks that, in the mashed-up metaverse, appear on various surfaces or objects viewed by participants.

In some embodiments, the mashed up metaverse may detect interactions by participants in the destination metaverse and report interaction information to the owner of the branded material. For example, if a user or an avatar looks at a brand displayed on an object in an immersive experience of the destination metaverse, this gaze may be detected and reported to the owner of the branded material. It may be registered as an impression of advertising for the branded material. Similarly, if the user or the user's avatar picks up or otherwise interacts with the object bearing the brand in the immersive experience, this may be further reported as a more significant interaction with the brand. Still further, if the destination metaverse enables commerce such as purchase and sales, and the user or avatar purchases the branded product, this may be registered as a sale and a most significant interaction with the brand.

In another use case, the shared metaverse may form a semi-private communication bridge or immersive telepresence for simultaneous usage by two or more parties. The communication bridge may be used for any suitable purpose such as between a buyer and seller of goods to show and demonstrate new products and answer questions. The communication bridge enables an immersive experience in which representative of each party may feel like they are meeting directly. Since the space is in the form of a shared metaverse, the space is always available and may be readily extended to other locations through suitable networking.

In another use case, the shared metaverse may enable a permissive or moderated merging process such as between an adult environment and a child environment. Rules of the shared process may limit what aspects of the adult environment, such as adult language, may be shared or instantiated in the child environment.

In another use case, the shared metaverse may enable personalization of a generic target metaverse with a personalized profile. Similar to the combination of one user's metaverse with a branded metaverse, in this example, the user may treat the generic target metaverse as a template or model which can be customized according to desires of the user. The user may define rules and policies that control how the content items of the user may be combined with the target metaverse. In some application, the combined metaverse may serve as a temporary experiment environment. Once the user sees how the metaverse operates when configured as a personalized template, the user may develop a fully custom metaverse. Such an example goes beyond using a personal profile alone to tailor a metaverse because it includes functional logic and a state of the personal metaverse.

In another use case, the shared metaverse may enable a digital asset management and conversion opportunity or marketplace. Any digital asset may be personalized or customized by combining features of a personal metaverse with features of the digital asset. This may provide to the user the ability to sell, buy, and negotiate for the digital asset within a targeted marketplace.

The system and method in accordance with various aspects described herein may provide many advantages and benefits. For example, the system and method may provide the ability to understand the process of merging metaverses within the same platform and across multiple platforms. The system and method may further guide users towards an optimal process of metaverse creation for either new metaverses or combined metaverses. In another example, the system and method may provide an ability to understand the spawning of a child metaverse from one or more parent metaverses. Such understanding may include an application of properties and rules to create an optimal experience for users, including receiving user feedback to modify the rules and policies that define the child metaverse. Similarly, the system and method in some embodiments include opt in and opt out rules for the participants. Such rules enable participants to control their participation in the metaverse. The rules may be more than just in or out. The rules may condition participation on certain factors or characteristics of the combined metaverse.

In another example, the system and method may provide methods to adapt ownership of a metaverse or an object of a metaverse, methods to adapt identities of users and participants in the metaverse and methods to determine results of interactions with objects and functions within overlapping metaverses. This, in turn, may provide the ability to represent the same object as different, contextual metaverses for varying user perspectives. One user may experience the mashed-up metaverse in a particular manner or style. Another user may experience the mashed-up metaverse in a different manner or style which may lead to improved opportunities for collaboration among the users. In an example, the mashed-up metaverse is a coaching metaverse formed by combining aspects of a teaching metaverse with a basic learning metaverse. The coaching metaverse allows a subject matter expert to work virtually with a trainee to improve skills of the trainee at a particular task, such as machine assembly of a workpiece. In virtual environment of the coaching metaverse, the trainee sees the workpiece from the perspective or context of the basic learning metaverse. All aspects of the assembly are new to the trainee and basic processes of locating a first component, locating a second component and joining the two components are highlighted by the immersive experience. The subject matter expert, observing the trainee, views the assembly process from the perspective of the teaching metaverse. In the immersion for the subject matter expert, the virtual experience highlights what has historically been the most difficult aspects of the assembly process for trainees to master, such as combining the first and second components. This enables the expert to focus attention in the coaching metaverse on the problem aspects of the process. The expert and the trainee are sharing the immersion but their association with the teaching metaverse and the basic learning metaverse, respectively, allows each to see the process from a respective individual context.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 230 presented in FIG. 1, FIG. 2A, FIG. 2B, FIG. 2C, and FIG. 3. For example, virtualized communication network 300 can facilitate in whole or in part a merger of two or more metaverses to form a destination metaverse or pocketverse and enable interaction by two or more users in an immersive experience in the destination metaverse.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall, which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
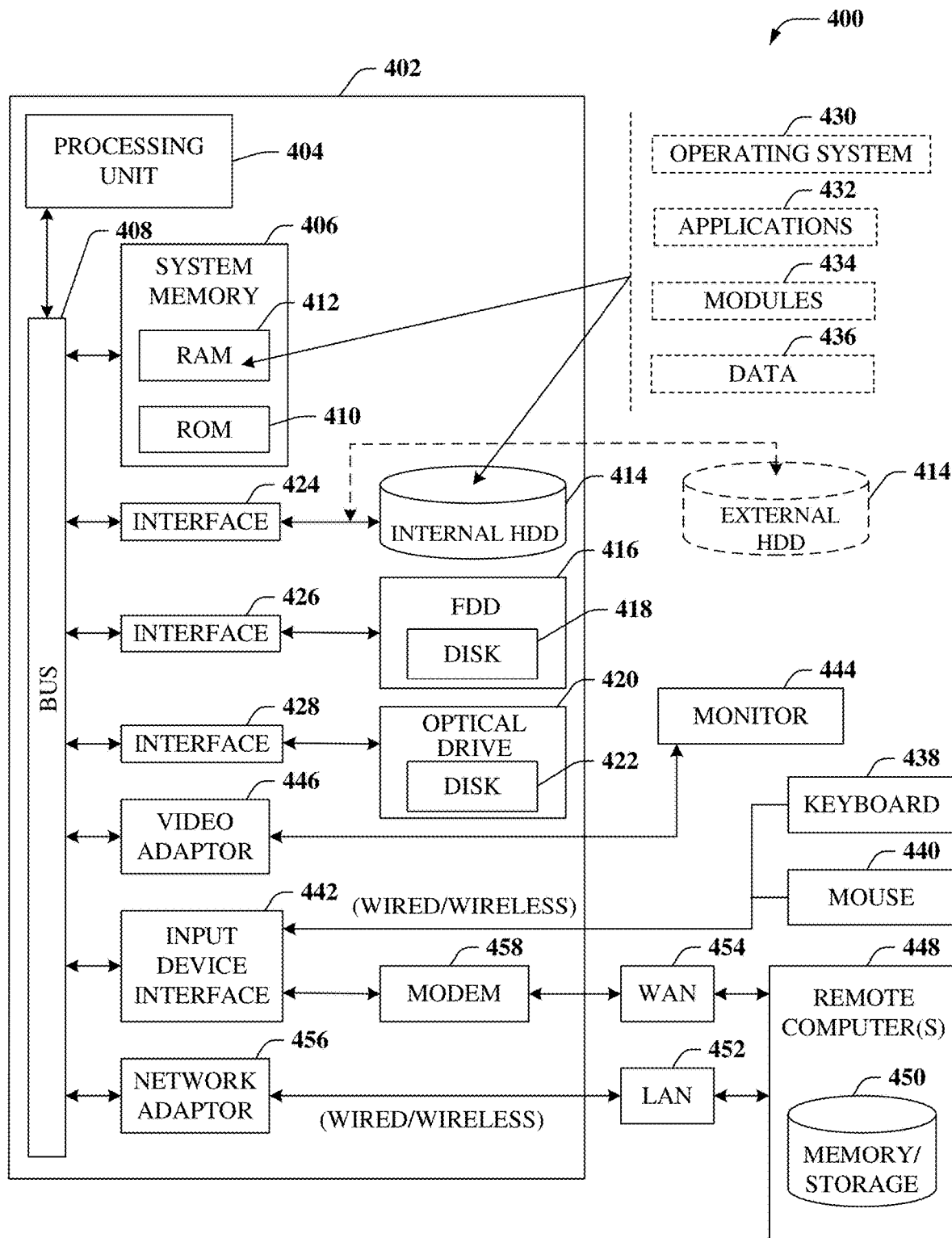
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a merger of two or more metaverses to form a destination metaverse or pocketverse. The computing environment 400 may operate to identify elements and objects of each source metaverse and manage modifications to enable the merger of the source metaverses. The computing environment 400 can negotiate a resolution to conflicts that occur based on rules or policies of the source metaverses or among the objects and capabilities of the source metaverse. The computing environment 400 can determine permanence rules and, based on the permanence rules, determine how objects of the destination metaverse should be handled upon termination or destruction of the destination metaverse.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
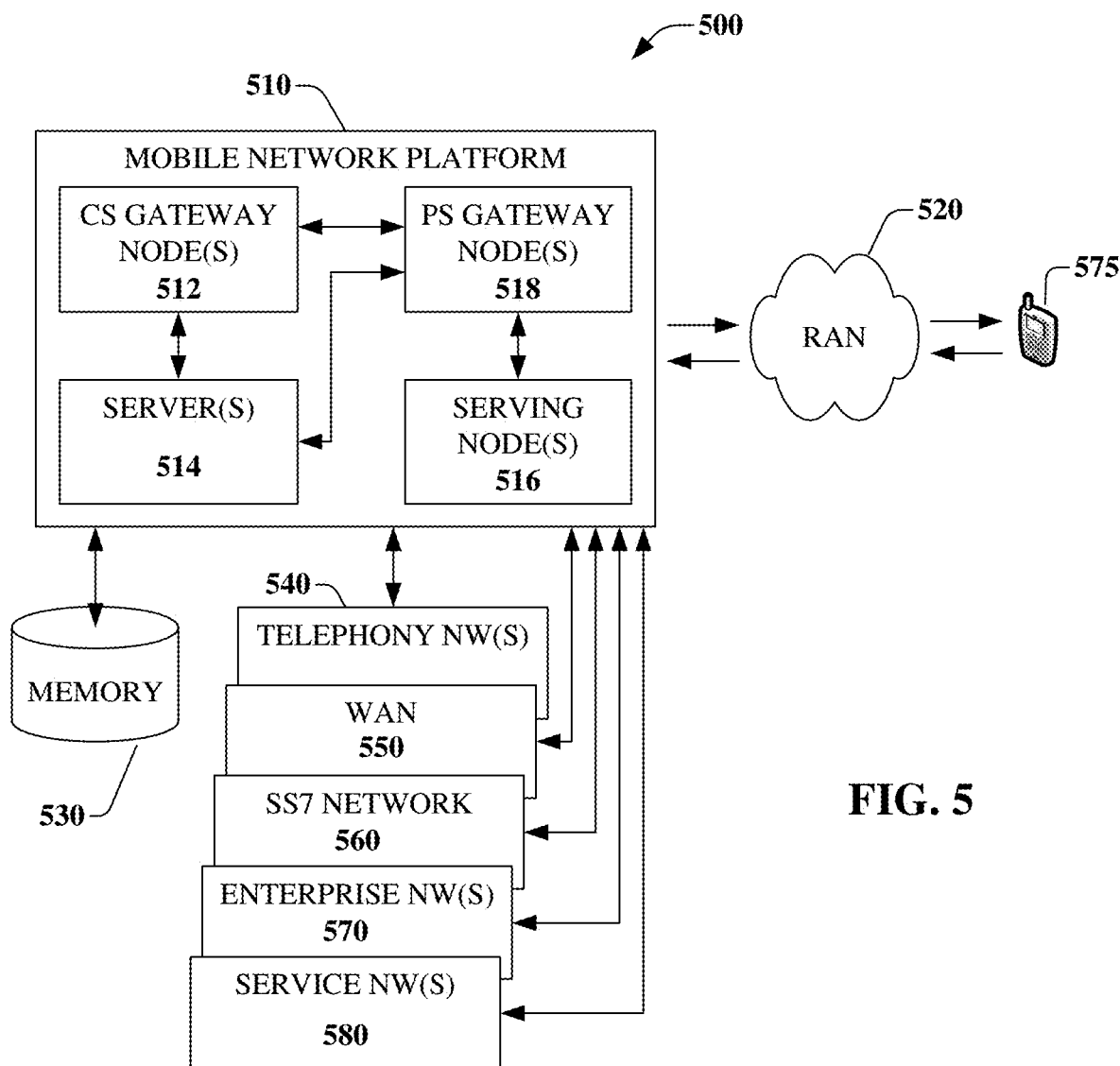
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a merger of two or more metaverses to form a destination metaverse or pocketverse. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
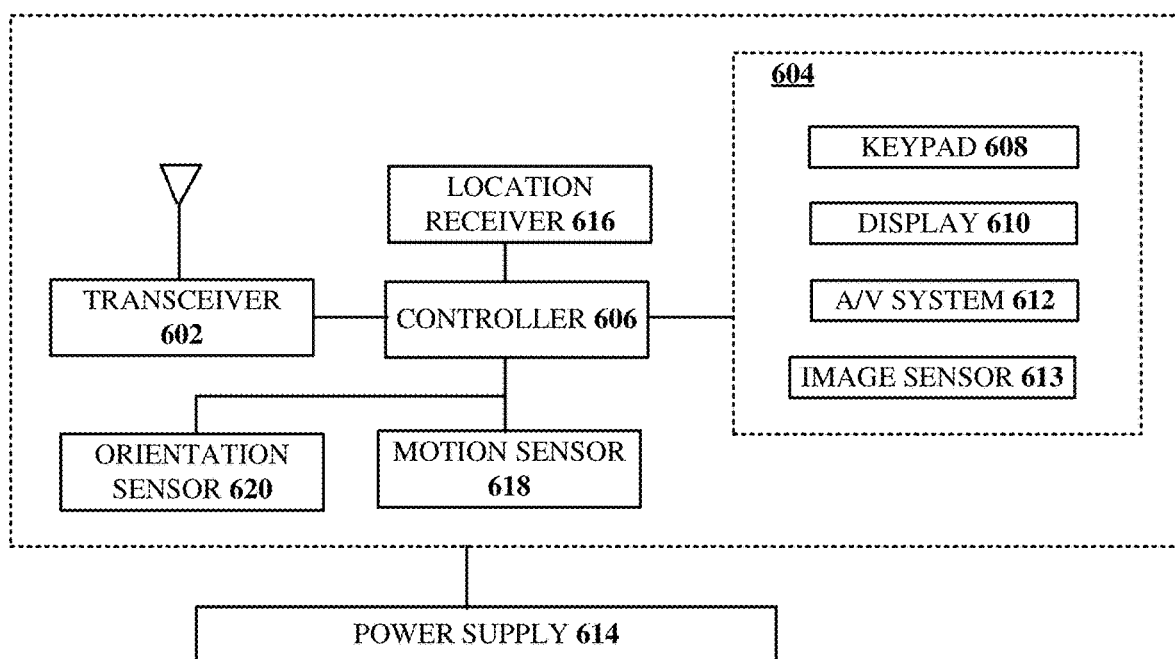
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a merger of two or more metaverses to form a destination metaverse or pocketverse.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving first defining information for a first metaverse;
receiving second defining information for a second metaverse;
identifying conflicts between the first defining information and the second defining information;

automatically negotiating resolution of the conflicts between the first defining information and the second defining information to define rules for a merged metaverse;

merging the first metaverse and the second metaverse according to the rules for the merged metaverse to define a destination metaverse;

interacting with a plurality of avatars to create an immersive experience in the destination metaverse;

providing, to a user associated with the first metaverse, an option to opt out of participation in the destination metaverse;

receiving, from the user associated with the first metaverse, an opt out indication; and compensating the user associated with the first metaverse for elements of the first metaverse merged into the destination metaverse, wherein the compensating is based on the receiving the opt out indication.

2. The device of claim 1, wherein the operations further comprise:

define rules for a mashup of the first metaverse and the second metaverse; or defining rules for a nesting of the first metaverse within the second metaverse.

3. The device of claim 1, wherein the automatically negotiating resolution of the conflicts comprises:

determining ownership of first objects in the first metaverse;

determining ownership of second objects in the second metaverse;

combining at least some of the first objects and at least some of the second objects in the destination metaverse; and specifying ownership of the at least some of the first objects and at least some of the second objects in the destination metaverse.

4. The device of claim 3, wherein the operations further comprise:

detecting an interaction between one object and another object in the destination metaverse; and determining, according to the rules for the merged metaverse, an effect of the interaction.

5. The device of claim 4, wherein the operations further comprise:

representing the one object and the another object according to a first context for a first user in the immersive experience in the destination metaverse; and representing the one object and the another object according to a second context for a second user in the immersive experience in the destination metaverse, wherein the second context is different from the first context.

6. The device of claim 1, wherein the operations further comprise:

automatically negotiating permanence rules for one or more objects in the destination metaverse, the permanence rules relating to a duration of the one or more objects as the one or more objects move from the first metaverse to the destination metaverse.

7. The device of claim 6, wherein the operations further comprise:

automatically negotiating terms for termination of the destination metaverse; and destroying the destination metaverse according to the terms for termination of the destination metaverse.

8. The device of claim 7, wherein the operations further comprise:

determining permanence rules for one or more objects in the destination metaverse; and destroying the destination metaverse according to the permanence rules, wherein the destroying the destination metaverse comprises destroying objects of a first group of the one or more objects according to the permanence rules and returning objects of a second group of the one or more objects to a source metaverse, the source metaverse comprising one of the first metaverse and the second metaverse.

9. The device of claim 1, wherein the first metaverse comprises a new metaverse and wherein the second metaverse comprises a branded metaverse, and wherein the operations further comprise:

automatically negotiating an agreement defining how brands of the branded metaverse will be used and will appear on branded objects in the destination metaverse; and displaying one or more brands on the branded objects to a plurality of users in the immersive experience in the destination metaverse.

10. The device of claim 9, wherein the operations further comprise:

detecting an interaction with a branded object by a user of the plurality of users in the immersive experience in the destination metaverse; and reporting the interaction with the branded object.

11. A non-transitory machine-readable medium, comprising executable instructions that, when executed by a processing system including a processor, facilitate performance of operations, the operations comprising:

identifying a first metaverse for merging with a second metaverse;

modifying the first metaverse and the second metaverse to form a destination metaverse, the destination metaverse including selected features of the first metaverse and the second metaverse;

facilitating interaction of a first avatar and a second avatar in an immersive environment of the destination metaverse;

determining permanence rules for one or more objects in the destination metaverse; and terminating the destination metaverse, wherein the terminating the destination metaverse occurs in response to a predetermined condition and wherein the terminating the destination metaverse occurs according to the permanence rules.

12. The non-transitory machine-readable medium of claim 11, wherein the operations further comprise:

presenting, to a first user, an immersive experience in the destination metaverse, the first user interacting with the immersive experience with a first user device; and presenting, to a second user, the immersive experience in the destination metaverse, the second user interacting with the first user in the immersive experience with a second user device.

13. The non-transitory machine-readable medium of claim 11, wherein the operations further comprise:

identifying first objects of the first metaverse;

identifying second objects of the second metaverse;

translating the first objects or the second objects for inclusion in the destination metaverse;

modifying appearance of the first objects or the second objects for inclusion in the destination metaverse; and modifying functionality of the first objects or the second objects for inclusion in the destination metaverse.

14. The non-transitory machine-readable medium of claim 11, wherein the operations further comprise:
    identifying first rules and policies that define the first metaverse;
    identifying second rules and policies that define the second metaverse;
    identifying conflicts between the first rules and policies and the second rules and policies; and
    automatically negotiating a resolution of the conflicts between the first rules and policies and the second rules and policies to form destination metaverse rules and policies.

15. The non-transitory machine-readable medium of claim 14, wherein the operations further comprise:
    identifying first virtual physics of the first metaverse;
    identifying second virtual physics of the second metaverse;
    identifying conflicts between the first virtual physics and the second virtual physics; and
    automatically negotiating a resolution of the conflicts between the first virtual physics and the second virtual physics to form destination metaverse physics.

16. The non-transitory machine-readable medium of claim 11, wherein the operations further comprise:
    identifying a metaverse template; and
    customizing the metaverse template for merging to form the destination metaverse.

17. A method, comprising:
    identifying, by a processing system including a processor, a first metaverse for merging with a second metaverse;
    modifying, by the processing system, the first metaverse and the second metaverse to form a destination metaverse, the destination metaverse including selected features of the first metaverse and the second metaverse;
    facilitating, by the processing system, interaction of a first avatar and a second avatar in an immersive environment of the destination metaverse;
    determining, by the processing system, permanence rules for one or more objects in the destination metaverse; and
    terminating, by the processing system, the destination metaverse, wherein the terminating the destination metaverse occurs in response to a predetermined condition and wherein the terminating the destination metaverse occurs according to the permanence rules.

18. The method of claim 17, wherein the identifying a first metaverse for merging comprises:
    identifying, by the processing system, a metaverse template; and
    customizing, by the processing system, the metaverse template for merging to form the destination metaverse.

19. The method of claim 17, comprising:
    capturing, by the processing system, a snapshot of the first metaverse at a moment in time; and
    customizing, by the processing system, the snapshot of the first metaverse for merging to form the destination metaverse.

20. The method of claim 17, comprising:
    determining, by the processing system, rules for a nesting of the first metaverse within the second metaverse.

* * * * *